United States Patent Office 2,726,226
Patented Dec. 6, 1955

2,726,226

COMPOSITION COMPRISING POLYSTYRENE, BUTADIENE-STYRENE COPOLYMER, AND A PHOSPHITE ESTER

Robert L. Werkheiser, Springfield, Mass., assignor to Monsanto Chemical Company, St. Louis, Mo., a corporation of Delaware No Drawing. Application November 12, 1952, Serial No. 320,134

10 Claims. (Cl. 260—45.5)

This invention relates to polystyrene molding powders. More particularly the invention relates to polystyrene molding powders containing in admixture therewith a copolymer of butadiene and styrene.

Polystyrene is a hard but brittle thermoplastic material which but for its brittleness would be exceptionally well adapted for use in the preparation of heavy duty containers such as storage battery cases. One of the best methods for reducing the brittleness without destroying other beneficial properties of the polystyrene is to blend the polymerized styrene with a copolymer of butadiene and styrene. The blending process presents many operating difficulties and attempts have been made to obtain the same result by dissolving the copolymer in the styrene monomer and then polymerizing the styrene. Most of the results of these attempts have been disappointing and little or no decrease in brittleness of the molded material has been observed.

One object of this invention is to decrease the brittleness of polystyrene.

A further object of this invention is to produce a less brittle polystyrene by dissolving a butadiene-styrene copolymer in styrene monomer and then polymerizing the styrene.

These and other objects are attained by adding an organic ester of phosphorous acid to the solution of butadiene-styrene copolymer in monomeric styrene prior to the polymerization step.

The following examples are given in illustration and are not intended as limitations on the scope of this invention. Where parts are mentioned they are parts by weight.

Example I

Dissolve 0.1 part of triphenyl phosphite, 0.1 part di-(tertiary butyl) peroxide and 8 parts of a copolymer of butadiene and styrene in 91.9 parts of monomeric styrene. The copolymer may contain 75% combined butadiene and 25% combined styrene by weight and have a Mooney viscosity of about 55. Heat the solution in the substantial absence of oxygen at 95° C. for 20 hours. Then gradually raise the temperature to 180° C. over a period of about 5 hours and finish the polymerization by further reaction at 180° C. for about 4 hours. A homogeneous solid mass is obtained in which the styrene homopolymer has a Staudinger molecular weight of about 60,000. The mass may be pulverized and then molded by injection or compression molding methods. The impact strength as determined by ASTM test D256–43T is about 3 foot pounds per inch of notch as compared to about 0.5 pound for unmodified homopolymer of styrene of similar molecular weight and about 0.7 pound for a composition similar to that prepared above except that the phosphorous ester is left out.

Similar results are obtained when the triphenyl phosphite of the example is replaced by an equal amount by weight of trialkyl phosphites such as tributyl phosphite, dialkyl phosphites such as dibutyl phosphite, and ring substituted triphenyl phosphites such as tri-(nitrophenyl) phosphite, tri-(chlorophenyl) phosphite, tricresyl phosphite.

The butadiene-styrene copolymers of this invention may contain from 50 to 90% combined butadiene by weight with the balance combined styrene and they should have a Mooney viscosity of from 40 to 75. These copolymers are subject to oxidative degradation over extended periods of time. This is true even in combination with polystyrene in which the copolymer is present in amounts less than 20% by weight of the combination. The oxidative degradation may be substantially retarded, if not altogether eliminated, by the incorporation of alkyl phenols in the copolymer. This may be done before the copolymer is dissolved in the styrene monomer. Strangely enough this does not substantially alter the polymerization rate nor the molecular weight of the final polymer even though it is known that the alkyl phenols are good inhibitors for polymerization of styrene.

Example II

Dissolve 0.1 part of octyl phenol and 8.1 parts of a copolymer of butadiene and styrene containing 71% combined butadiene and 29% combined styrene and having a Mooney viscosity of about 45 in 91.8 parts of styrene monomer and then add 0.1 part of tricresyl phosphite and 0.1 part of di(tertiary-butyl) peroxide to the solution. Heat the solution in the substantial absence of oxygen for 20 hours at 95° C., then raise the temperature to 185° C. over a period of five hours and finally heat the reaction mass at 185° C. for four hours. The product is a solid block of polystyrene having the copolymer, alkyl phenol, and tricresyl phosphite homogeneously dispersed therethrough. The material may be pulverized and molded by injection and compression molding means. It has an impact strength of about 2.9 foot pounds per inch of notch. When the amount of tricresyl phosphite is increased to 0.5 part the reaction proceeds just as smoothly and quickly and the product has a higher impact strength, i. e. about 3.6 foot pounds per inch of notch.

Example III

Repeat the process of Example II except that 0.5 part of tributyl phosphite is used instead of 0.1 part of tricresyl phosphite. No substantial variation in the process is noted and the product has an impact strength of about 4 foot pounds per inch of notch. When 0.5 part dibutyl phosphite is used instead of tributyl phosphite, the impact strength is about 3.3 foot pounds per inch of notch.

The organo phosphites of this invention are the di- and tri-organic esters of phosphorous acid. The alcohols used to esterify the phosphorous acid may be alkyl, aralkyl or aryl or a mixture of one or more of these alcohols. Examples of phosphite esters which may be used are the di- and tri-methyl, ethyl, butyl, octyl, lauryl, phenyl, benzyl, chlorophenyl, nitrophenyl, naphthyl phosphites, monobutyl diphenyl phosphite, diethyl monophenyl phosphite, monocresyl diphenyl phosphite, etc. The amount of phosphite used may vary between about 0.05 and 1.0 part per 100 parts of styrene monomer. If more than 1 part is used, the esters either soften the product too much or are incompatible therewith and gradually exude therefrom.

The butadiene-styrene copolymer used may contain from 50 to 90% combined butadiene. The amount of the copolymer used may vary from 1 to about 50 parts per 100 parts of styrene monomer. As the amount of copolymer is increased, the impact strength increases and the tensile strength decreases. For most purposes, the decrease in tensile strength is too great if more than 20 parts of copolymer is used. At from 1 to 4 parts of copolymer, there is a definite increase in the impact strength without a corresponding decrease in tensile strength. However, the increase in impact strength with the increasing amounts of copolymer depends also on the presence of the phosphite esters and is accentuated by increasing amounts of the phosphite esters up to a limit of about 1 part per 100 parts of styrene.

If an alkyl phenol is used it should be used in amounts ranging from 0.05 to about 0.2 part per 100 parts of styrene. Among the alkyl phenols which may be used are compounds in which the alkyl group contains from 4 to 12 carbon atoms and the phenol is monohydric or dihydric. Among such compounds are butyl, octyl, and lauryl phenol, tertiary butyl catechol, etc. The alkyl phenols are preferably incorporated during compounding operations after polymerization is complete. However, they may be incorporated in the copolymer prior to the solution of the copolymer in styrene monomer or, as shown in Example II, they may be dissolved in the monomer along with the copolymer prior to polymerization.

The process of this invention is preferably carried out by dissolving the copolymer and the phosphorous acid ester in styrene followed by polymerization of the styrene in the presence of a peroxy catalyst. The polymerization temperature should be held at from 90 to 120° C. until the polymerization is about 25% complete. This ordinarily takes from 10 to 30 hours depending on the temperature, the amount of catalyst, etc. The temperature is then raised slowly to about 185° C. over a period of from 4 to 6 hours and the final polymerization is carried out at 185° C. to 200° C. for from 3 to 6 hours. Using this cycle the Staudinger molecular weight of the styrene polymer may vary from about 30,000 to about 80,000 depending on time, temperature and amount of catalyst. For most purposes the Staudinger molecular weight should be betwen 50,000 and 80,000.

Under some conditions it may be desirable to incorporate the phosphorous acid ester in the copolymer prior to the addition of the copolymer to the styrene monomer. This may be done during the copolymerization process or by conventional compounding methods after the copolymerization is complete. Substantially no advantageous effects are observed when the phosphorous acid ester is added to the composition of this invention after the polymerization is complete or by adding the phosphorous acid ester to a blend of polystyrene and copolymer.

Any of the well-known mass polymerization catalysts may be used such as benzoyl peroxide, lauroyl peroxide, di-(tertiary-butyl) peroxide, tertiary butyl hydroperoxide, etc. In general the peroxide catalyzed systems for the polymerization of styrene require the substantial absence of free oxygen during the reaction. This is best carried out by keeping a blanket of oxygen-free nitrogen or other inert gas over the reaction mass.

Various conventional additives may be incorporated in the product of this invention by conventional methods such as dry blending, roll milling, extrusion, etc. Among such additives are pigments, dyes, lubricants, anti-staticizers etc.

The process of this invention makes it possible to obtain a high impact strength composition by dissolving a butadiene-styrene copolymer in styrene monomer followed by polymerization of the styrene.

It is obvious that variations may be made in the products and processes of this invention without departing from the spirit and scope thereof as defined in the appended claims.

What is claimed is:

1. A composition comprising 100 parts of polystyrene, from 1 to 20 parts of a copolymer of butadiene and styrene in which the combined butadiene constitutes at least 50% by weight and from 0.05 to 1 part of an organic monohydric alcohol ester of phosphorous acid, said composition having been prepared by dissolving the copolymer and the phosphorous acid ester in the styrene monomer followed by polymerization of the monomer to an average molecular weight of at least 30,000.

2. A composition as in claim 1 wherein the amount of combined butadiene in the copolymer is 71%.

3. A composition as in claim 1 wherein the phosphorous acid ester is a triaryl phosphite.

4. A composition as in claim 3 wherein the triaryl phosphite is triphenyl phosphite.

5. A composition as in claim 1 wherein the phosphorous acid ester is a trialkyl phosphite.

6. A composition as in claim 5 wherein the trialkyl phosphite is tributyl phosphite.

7. A composition as in claim 1 which also contains an alkyl phenol.

8. A composition as in claim 7 wherein the alkyl phenol is octyl phenol.

9. A composition comprising 91.9 parts of polystyrene, 0.1 part of triphenyl phosphite, and 8 parts of a copolymer of butadiene and styrene containing 75% by weight of combined butadiene, said composition having been prepared by dissolving the copolymer and the triphenyl phosphite in styrene monomer followed by polymerization of the monomer to a Staudinger molecular weight of about 60,000.

10. A process which comprises dissolving from 1 to 20 parts of a copolymer of butadiene and styrene and from 0.05 to 1 part of an organic monohydric alcohol ester of phosphorous acid in 100 parts of styrene monomer and then polymerizing the styrene to an average molecular weight of at least 30,000, the copolymer consisting of at least 50% of combined butadiene by weight.

References Cited in the file of this patent

UNITED STATES PATENTS

| | | |
|---|---|---|
| 2,356,965 | Allison | Aug. 29, 1944 |
| 2,419,354 | Howland | Apr. 22, 1947 |
| 2,543,635 | Loritsch | Feb. 17, 1951 |
| 2,578,518 | Ditz | Dec. 11, 1951 |
| 2,606,163 | Morris et al. | Aug. 5, 1952 |